United States Patent [19]

Clements et al.

[11] Patent Number: 4,707,571
[45] Date of Patent: Nov. 17, 1987

[54] ERGONOMIC DIGITIZER STYLUS

[75] Inventors: Brad Clements, Fort Collins; John C. Keith, Loveland, both of Colo.

[73] Assignee: Hewlett-Packard Company, Palo Alto, Calif.

[21] Appl. No.: 924,248

[22] Filed: Oct. 29, 1986

[51] Int. Cl.$^4$ ............................................ G08C 21/00
[52] U.S. Cl. .................................................... 178/18
[58] Field of Search ........................... 178/18, 19, 20; 200/56 R; 382/59; 340/707, 709

[56] References Cited

U.S. PATENT DOCUMENTS 3,182,291  5/1965  Nassimbene ......................... 178/18
3,462,548  8/1969  Rinder ................................. 178/18
4,495,646  1/1985  Gharachorlo ........................ 358/59

Primary Examiner—Stafford D. Schreyer
Attorney, Agent, or Firm—Edward L. Miller

[57] ABSTRACT

A handheld stylus for a digitizer includes a tip that is angled downward to meet the digitizing surface at almost, but not quite, a right angle. The body of the stylus is of a generally triangular cross section. Mounted upon the stylus are pushbutton switches actuatable by a force along a line essentially at right angles to the digitizing surface when the stylus is in use. An anti-rolling winged member keeps the stylus from rolling when it is laid over on its top after use.

2 Claims, 3 Drawing Figures

ERGONOMIC DIGITIZER STYLUS

BACKGROUND AND SUMMARY OF THE INVENTION

It is common for a digitizing tablet to operate in conjunction with a handheld stylus. It is also known for handheld wand-like or stylus-like tools to include switches to control or activate some process involving the tool. Certain problems arise in a digitizing application, however, when pushbutton switches are included on a stylus. First, pressing a switch on the stylus can cause an unwanted movement of the tip of the stylus. It would be desirable if the geometry of the stylus and its switches were arranged to minimize the tendency of the point to move during the application of force to actuate the switches. Next, if the shape of the stylus allows the hand to grip the stylus in different rotational positions relative to the switches from one use to the next, it can be difficult to always activate the switches with a motion that does not disturb the stylus position. It would be desirable if the cross-sectional shape of the stylus served both to orient the stylus in the hand for the optimum application of force to the switches as well as to provide a comfortable fit between the fingers. And finally, it would be desirable if the stylus incorporated means to lay the stylus down and then pick it up again with easy quick motions and yet have it be correctly oriented in the hand.

The tendency of the point of the stylus to move may be minimized by (a) noting the angle at which the body of the stylus is most often held while in use, and then angling the tip of the stylus relative to the body so that the tip is nearly, but not quite, perpendicular to the platen, or digitizing surface, in conjunction with (b) angling the caps of the pushbutton switches on the stylus to allow the switches to be actuated with a generally downward motion toward the platen, and (c) arranging that the line of action for the pushbutton switches be such that a force applied by an actuating finger forces the stylus against the platen substantially along the axis of the tip. The tendency of the stylus to rotate in the hand from one use to the next may be reduced by imparting a substantially triangular cross section to the body of the stylus. Lastly, by noting that most users lay the stylus down by simply bending their wrist and releasing their grip, resulting in the stylus laying upside down and pointing towards the hand, a pair of legs or a winged member attached to the stylus body at the end opposite the tip will keep the stylus from rolling and in the position it was in when released. It is then a very easy task to simply reverse the motions of the hand to retrieve the stylus in one quick movement.

DESCRIPTION OF A PREFERRED EMBODIMENT

Figure 1:
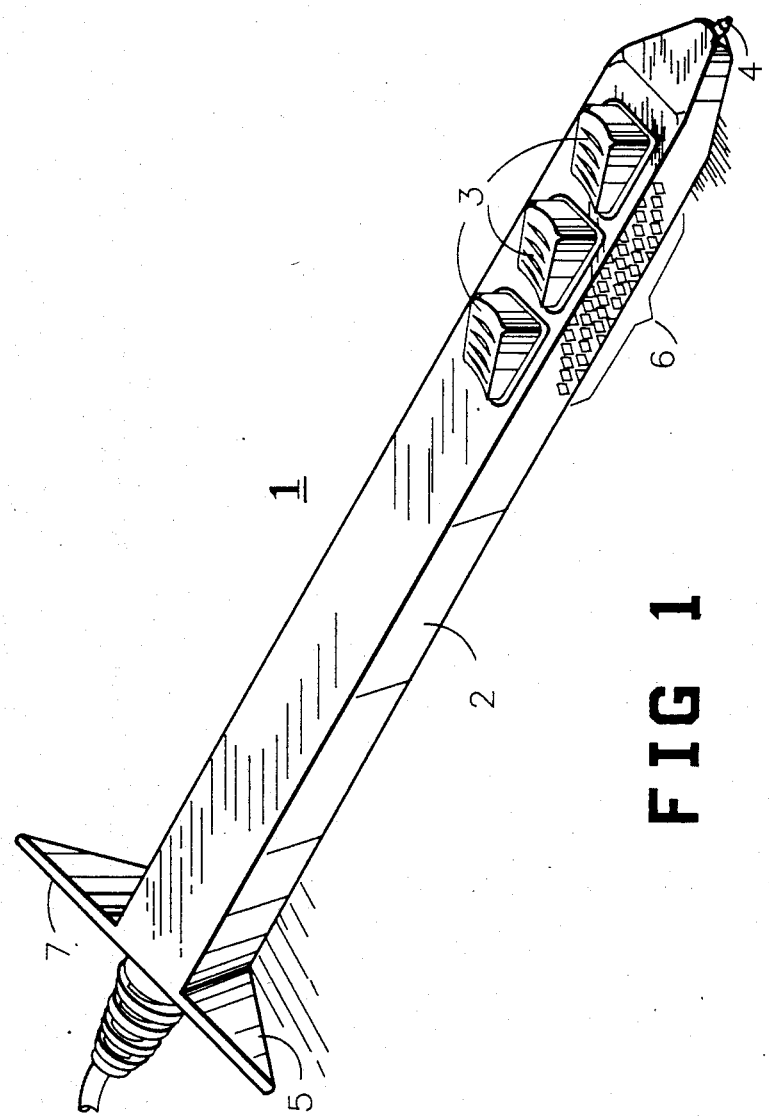
FIG. 1 is a perspective view of a handheld digitizing stylus incorporating an angled tip, angled caps for pushbutton switches, a generally triangular cross section, and a wing member to prevent rolling.
Figure 3:
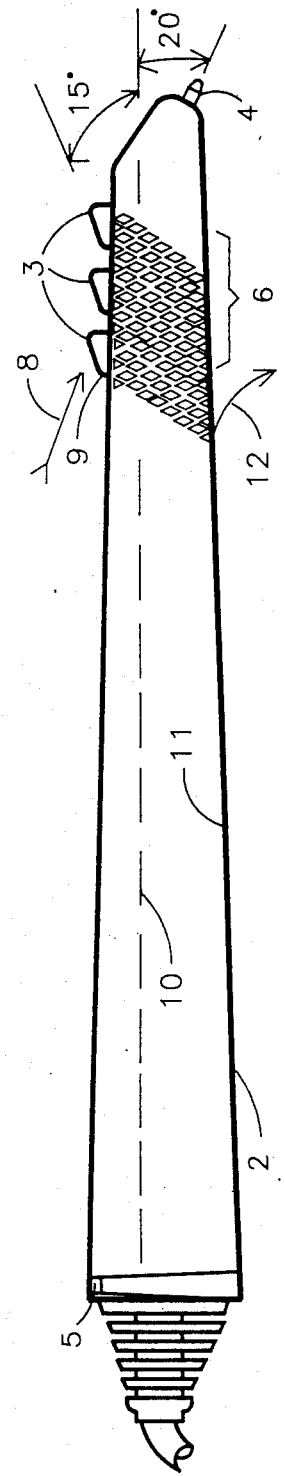
FIG. 3 is an end elevational view of the digitizing stylus of FIG. 1.

Refer now to FIG. 1, were is shown a perspective view of a handheld digitizing stylus 1. The body 2 of the stylus 1 is of a generally triangular shape, as may be seen by a brief examination of FIG. 3. Similar to gripping a pencil, the body 2 of the stylus 1 is gripped between the thumb and middle finger of one hand, in the vicinity of a knurled region 6. The forefinger descends from above and rests on one of the pushbutton switches 3. A tip 4 serves as the electrical center of the sensing mechanism used in the digitizing process. The tip 4 is angled down approximately twenty degrees relative to the body 2, so that it is near to being perpendicular to the platen when the stylus 1 is being held in the hand. Finally, note the wing member 5 at the end of the stylus 2 opposite the tip 4. It has a long top edge 7 that keeps the stylus 1 from rolling or tilting when the stylus 1 is laid face down on its top. In such a position the stylus 1 rests upon the long edge 7 of the wing member 5 and on the raised edges of the pushbutton keys 3.

Figure 2:
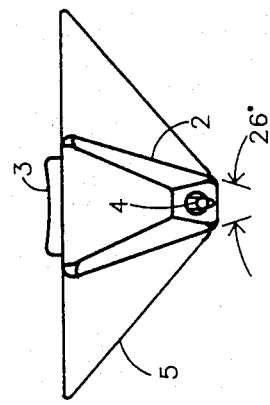
FIG. 2 is a side elevational view of the digitizing stylus of FIG. 1.

Referring now to FIG. 2, the triangular cross section of the body 2 may be more clearly seen. As shown in the figure, the opposite sides gripped by the thumb and second finger would, if extended, meet with an angle of twenty-six degrees.

Referring again to FIG. 3, the tops of the pushbutton switches 3 are angled up from the longitudinal axis 10 by fifteen degrees. They are each hinged at the end that slopes back into the body 2, as shown by reference numeral 9. In this way a force applied along arrow 8 both actuates the pushbutton and forces the tip 4 against the platen. The latter effect arises as follows. In use, the body 2 is cradled in the hand of the user by the intersection of the thumb and forefinger at point 11. When force is applied by a fingertip along the line of arrow 8 the body 2 attempts to pivot about point 11 in the direction of arrow 12. This urges the tip 4 against the platen. When the stylus body 2 is held in the hand for use, line of force 8 is nearly perpendicular to the platen and arises with a natural downward motion of the finger. This results in a minimum of disturbance to the position of the tip 4 when one of the pushbuttons 3 is activated.

A further advantage follows from the angled tip 4. When the stylus 1 is released by laying it over onto its top the tip 4 points up away from the digitizing surface, and is further away from that surface than it would be if it extended straight out along the longitudinal axis. This extra distance of perhaps one quarter to three eights of an inch substantially decreases the electrical coupling between the tip 4 and the digitizing surface. It is relatively easy to arrange that such low coupling result in a "no signal" condition and then ignore any pushbutton switches that are activated during the no signal condition. In this way, a pushbutton switch activated by pressure applied accidentally to the upside-down stylus will have no effect.

We claim:
1. A digitizer stylus or the like comprising:
a body of generally triangular cross section extending along a longitudinal axis and formed of a top surface and two adjacent nonparallel sides intersecting along the underside of the body;
a tip at one end of the body, the tip inclined away from the longitudinal axis in a first direction toward the line of intersection by a first acute angle; and switch means, disposed upon the top surface and having an actuating surface for receiving a force to activate the switch means, the actuating surface being inclined away from the top surface in a second direction, opposite the first, by a second acute angle, and being hinged to the top surface in the vicinity of where the inclined actuating surface intersects the top surface.

2. A digitizer stylus or the like comprising:

a body of generally triangular cross section extending along a longitidiunal axis and formed of a top surface and two adjacent nonparallel sides intersecting along the underside of the body;

a tip at one end of the body, the tip inclined away from the longitudinal axis in a first direction toward the line of intersection by a first acute angle;

switch means, disposed upon the top surface and having an actuating surface for receiving a force to activate the switch means, the actuating surface being inclined away from the top surface in a second direction, opposite the first, by a second acute angle, and being hinged to the top surface in the vicinity of where the inclined actuating surface intersects the top surface; and a winged member, located at the end of the body opposite the tip, having a upper surface substantially in the plane of the top surface and extending outwards away from the longitudinal axis.

* * * * *